United States Patent [19]

Yamada

[11] 4,068,241

[45] Jan. 10, 1978

[54] INK-JET RECORDING DEVICE WITH ALTERNATE SMALL AND LARGE DROPS

[75] Inventor: Takahiro Yamada, Hitachi, Japan

[73] Assignee: Hitachi, Ltd., Japan

[21] Appl. No.: 746,157

[22] Filed: Nov. 30, 1976

[30] Foreign Application Priority Data

Dec. 8, 1975 Japan ................................ 50-145090

[51] Int. Cl.[2] .............................................. G01D 15/18

[52] U.S. Cl. .................................................... 346/75

[58] Field of Search ........................................... 346/75

[56] References Cited

U.S. PATENT DOCUMENTS

| | | | |
|---|---|---|---|
| 3,334,351 | 8/1967 | Stauffer | 346/75 |
| 3,562,757 | 2/1971 | Bischoff | 346/75 X |
| 3,656,171 | 4/1972 | Robertson | 346/75 X |
| 3,769,627 | 10/1973 | Stone | 346/75 |
| 3,846,800 | 11/1974 | Chen | 346/75 X |
| 4,016,571 | 4/1977 | Yamada | 346/75 |

*Primary Examiner*—George H. Miller, Jr.
*Attorney, Agent, or Firm*—Craig & Antonelli

[57] ABSTRACT

When mechanical vibration of a certain magnitude is given to an ink-jet column ejected out of a nozzle, the tip of said ink-jet column is synchronized to said vibration to become separated into two kinds of ink droplets, relatively large and small, alternately, and the present invention utilizes this fact to provide an ink-jet recording device, construction thereof is such that large droplets are intercepted during their flight and are prevented from reaching the surface to be recorded, and also the small object not required for recording are united with the large droplets to be intercepted, by varying the strength of the vibration.

8 Claims, 15 Drawing Figures

Figure 1:
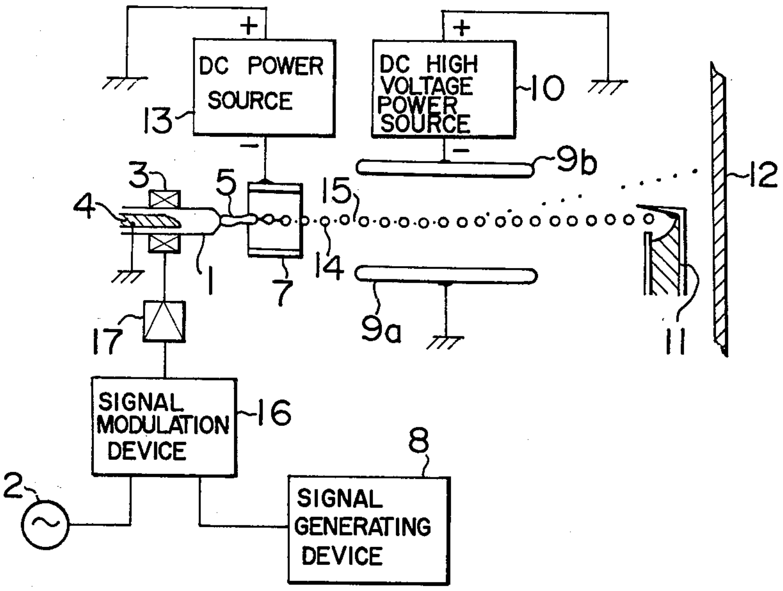

12
11
24
25
15
14
DROPLET FLIGHT DIRECTION

INK-JET RECORDING DEVICE WITH ALTERNATE SMALL AND LARGE DROPS

The present invention relates to an ink-jet recording device, and more particulary to an ink-jet recording device, wherein ink-jet droplets are ejected out of a nozzle as two kinds of large and small droplets, and the smaller ones of said ink droplets are used in recording.

An ink-jet recording device is such a one that forces ink droplets ejected from a nozzle to be deflected and restricted in order to record a dot pattern on a surface to be recorded on. In a conventional ink-jet recording device it is necessary to control the application of an electric charge to ink droplets by electrical signals used for recording through insuring the generation frequency of ink droplets by giving mechanical vibration to the ink column formed at the tip of the nozzle, as disclosed in U.S. Pat. No. 3,596,275 (Richard G. Sweet, appl. Ser. No. 354,659, Filed: Mar. 25, 1964, Patented: July 27, 1971). In such an ink-jet recording device, it has been required to provide an apparatus for matching a generation phase of ink droplets to a generation phase of the electrical signals used for recording. Further, the ink has been required to have good and stabilized electrical conductivity in order to let ink droplets be charged instantaneously with the signal voltage, and therefore, restriction has been needed for the material used in making the ink. Moreover, an amplifier generating high frequency and high voltage electric signals with high fidelity also has been necessary to control the amount of electric charge delivered to each ink droplets. Furthermore, in conventional ink-jet recording devices, the dots recorded on a surface to be recorded had a diameter approximately equal to 5 times that of the nozzle diameter, and therefore, when it was intended to make the recorded dots small in order to make recording with high resolution images, the nozzle hole should be made smaller, but such defects occurred wherein the manufacturing process thereof became difficult and clogging of the nozzle became liable to occur.

It is the purpose of the present invention to provide an ink-jet recording device which requires no complicated control device for controlling an electric charge given to ink droplets being ejected from a tip of a nozzle.

Another purpose of the present invention resides in providing an ink-jet recording device capable of easily controlling the deflection of ink droplets even in the case where relatively low conductance ink is used.

Further purpose of the present invention is to provide an ink-jet recording device capable of obtaining recorded images with smaller recorded dots than those in a conventional device in comparison to a nozzle hole diameter.

Further objects of the present invention will be understood from the detailed explanation of the invention described in the following.

According to the present invention, the ink ejected out of a nozzle is designed to become separated regularly and alternately into two kinds of ink droplets, relatively large and small. Deflecting means for ink droplets is established in such a way as the deflection amount is different for the small ink droplets and the large ink droplets, and catcher means for ink droplets is established at a position which intercepts a flight path of flying large ink particles. A flight speed of the small ink droplets in comparison to that of the large ink droplets is controlled according to the electric signals for recording, and the small ink droplets unnecessary for recording are made to collide and unite with large droplets before they are deflected to a large extent, and to be intercepted together with the large ink droplets by the catcher means.

Figure 2:
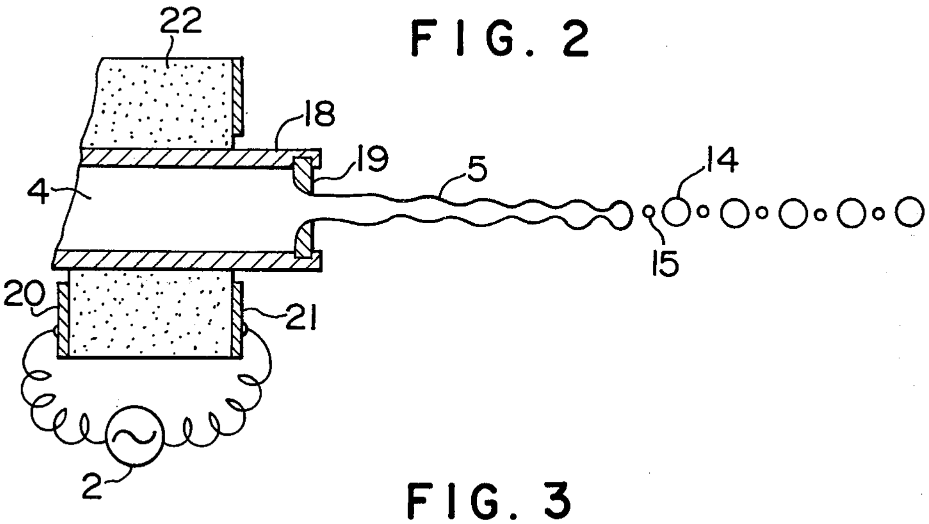
Figure 3:
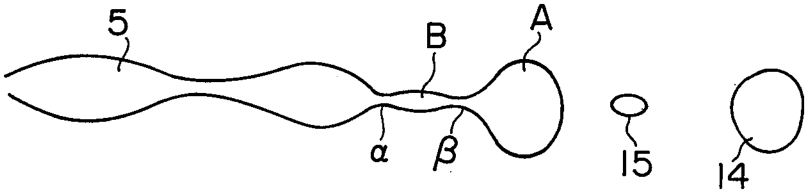
Figure 4:
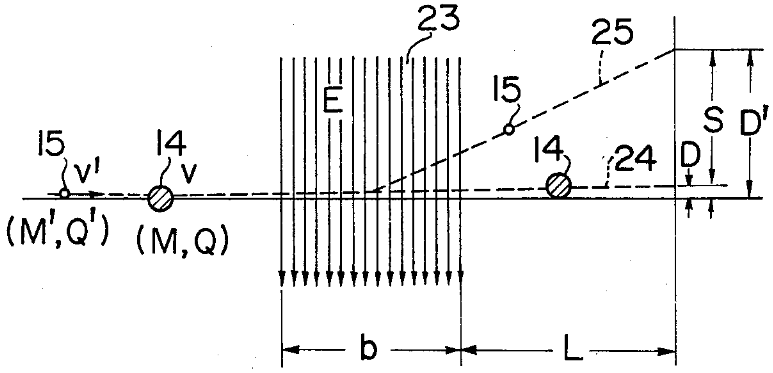
Figure 5A:
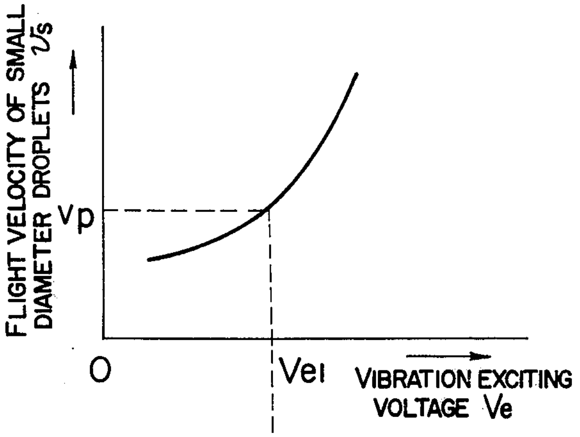
Figure 5B:
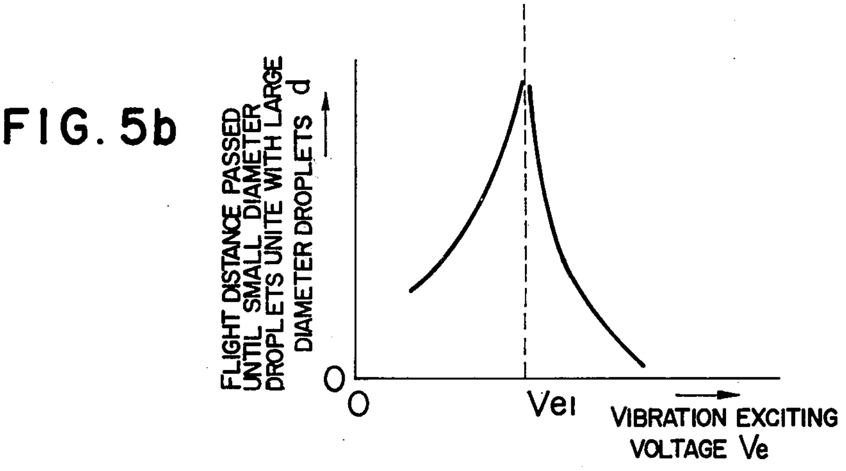
Figure 6:
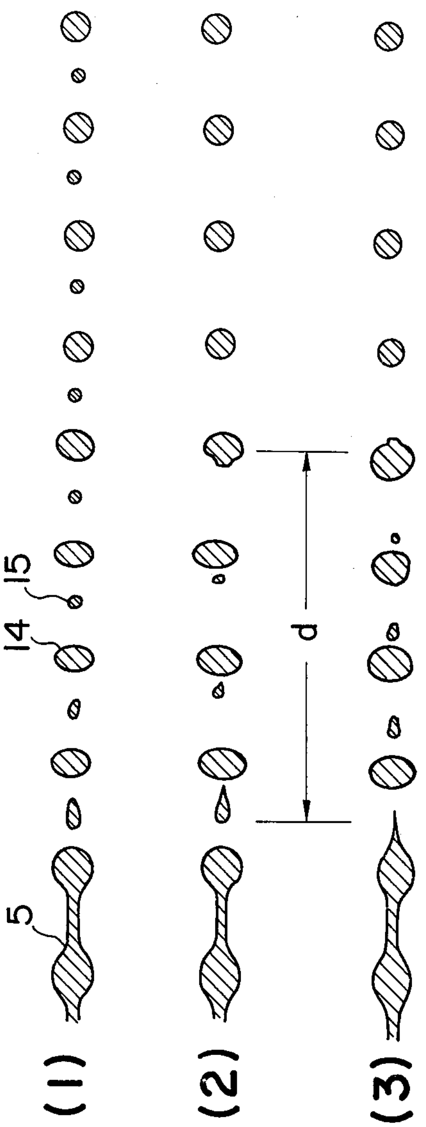
Figure 9:
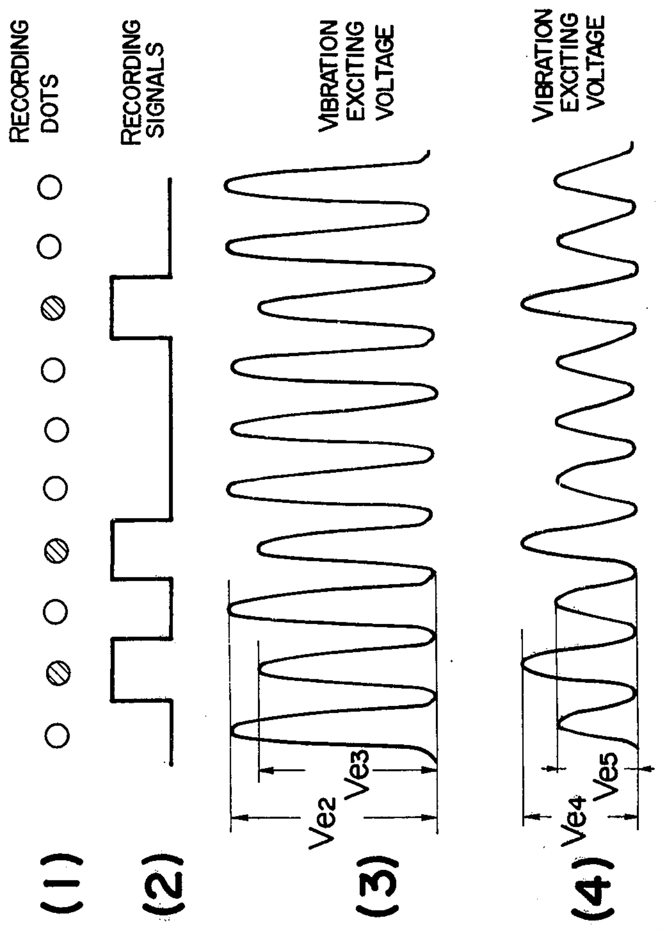
Figure 7A:
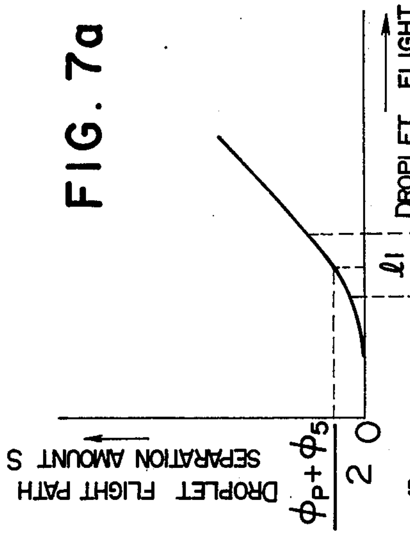
Figure 7B:
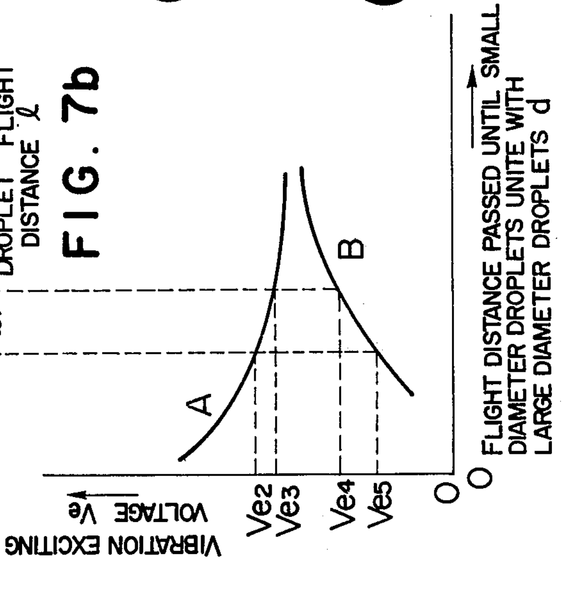
Figures 8A, 8B:
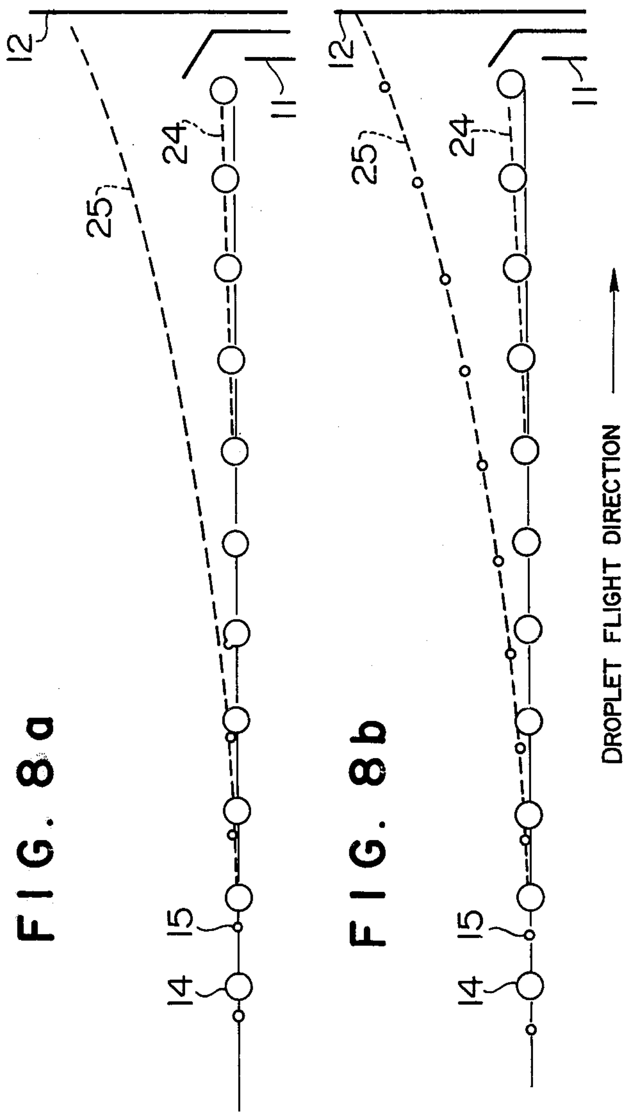
Figure 10:
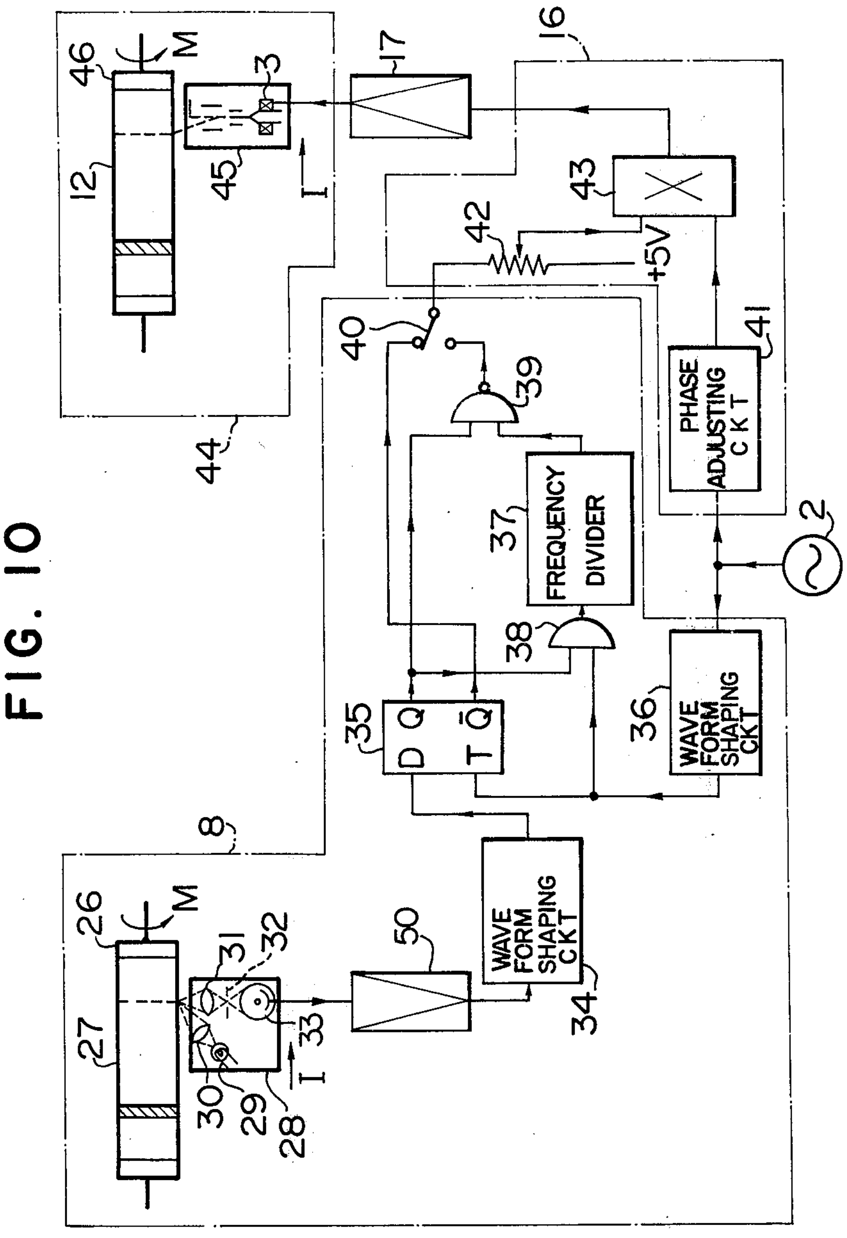
Figure 11:
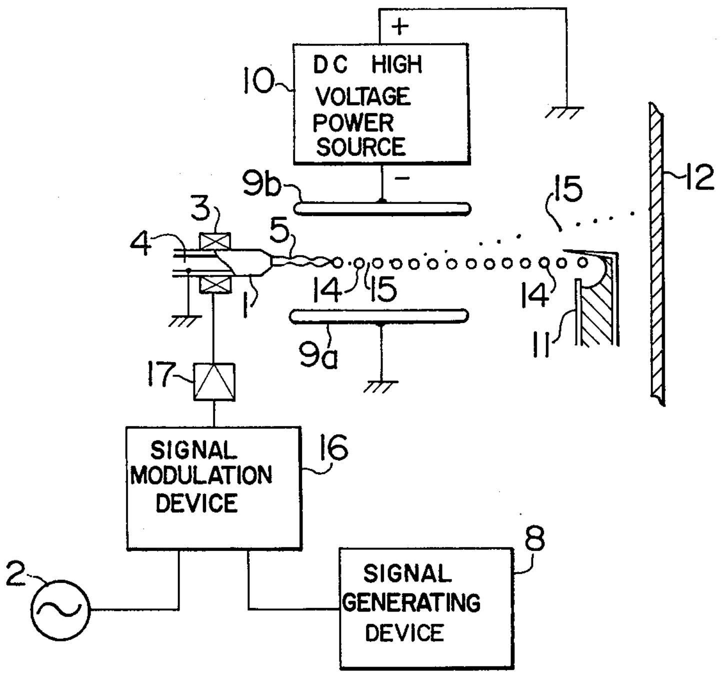
Figure 12:
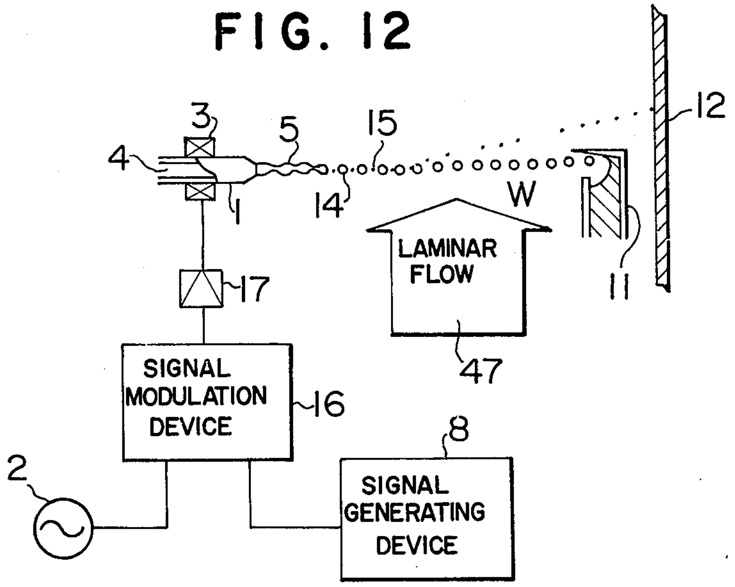

FIG. 1 is a general schematic view of an ink-jet recording device according to the present invention; FIG. 2 is a schematic view showing an ink droplet formation state in the present invention; FIG. 3 is a schematic view showing an ink droplet in a separate state in the present invention; FIG. 4 is an explanatory drawing of an ink droplet deflection amount; FIG. 5*a* is a characteristic diagram of a small sized ink droplet flight speed $Vs$ against a vibration exciting voltage $Ve$; FIG. 5*b* is a characteristics diagram of the uniting distance $d$ of large and small diameter ink droplets against a vibration exciting voltage $Ve$; FIGS. 6(1), (2) and (3) are an explanatory drawings for an ink droplet flying state; FIG. 7*a* is a characteristics diagram of a flight path separation amount against a flight distance $l$ of ink droplets; FIG. 7*b* is a characteristics diagram of the vibration exciting voltage $Ve$ against the uniting distance $d$ of large and small diameter ink droplets; FIG. 8*a* and FIG. 8*b* are explanatory drawings for an ink droplet deflective flight; FIGS. 9(1), (2), (3), and (4) show recording time charts; FIG. 10 is a block diagram showing a concrete example of an ink-jet recording device according to the present invention; and FIGS. 11 and 12 are general schematic views of ink-jet recording devices in the other embodiments of the present invention.

FIG. 1 shows a fundamental construction of an ink-jet recording device according to the present invention. Pressurized ink 4 provided with a predetermined pressure is lead through a nozzle 1 mounted with an electromechanical transducer element 3, to be ejected out of the nozzle hole. Then, the electromechanical transducer element 3 is excited according to an output signal of a high frequency power source 2 to separate an ejected ink into ink droplets of 2 kinds of magnitude, large and small, alternately and emit them toward a body to be recorded 12. An electrically charged electrode 7 is placed in the vicinity of a tip part of an ink column 5 extended from the nozzle hole for a predetermined distance, and static capacity is formed between the ink column 5 and the electrode 7 to give charge to the large diameter droplets 14 and small diameter droplets 15 by connecting a D.C. power source 13 for droplets charging between the electrode 7 and ink 4. To form an electric field for giving deflective power to these ink droplets, deflecting electrodes 9*a* and 9*b* are installed at both sides of a flight path of the ink droplets and a D.C. high voltage power source 10 for deflection use is connected across these electrodes 9*a* and 9*b*. This causes the large diameter ink droplets 14 and small diameter ink droplets 15 to deflect in correspondence to their deflecting characteristics during flight thereof, or to be separated for the amount corresponding to the flight distance or flight time to the deflection direction. An electric signal modulating device 16 for vibration excitation use and an electric signal amplifier 17 for vibration excitation use are made to intervene between the high frequency power source 2 and electromechanical transducer element 3, the electric signal modulating device for vibration exciting use 16 being made to vary the magnitude of the electric signal for vibration excitation in accordance with the electric signals from the electric signal generating device 8 for recording use to change the flight velocity of the small diameter ink droplets 15. Numeral 11 denotes an ink diameter catcher means placed at a position where the flight path of the large diameter ink droplets 14 and united ink droplets of large and small diameter ones is caught or trapped.

Explanation will be given in the following as to a technique in separating an ink into large diameter droplets 14 and small diameter droplets 15 alternately and regularly.

FIG. 2 shows the state of the ink droplet and column being formed, where the nozzle 1 comprises a metal pipe 18 and an orifice 19 having a hole for ejecting ink, and the electromechanical transducer element 3 comprises a PZT electrostrictive vibrator 22 and electrodes 20 and 21 adhered to its both end surfaces. By ejecting ink 4 pressurized to a predetermined pressure by a pump or the like from the nozzle hole, a capillary ink column 5 with a long and narrow cylindrical pillar shape can be formed. On the other hand, electrostrictive vibrator 22 is energized and vibrated at a high frequency signal voltage with a constant frequency so that the vibration due to it can be applied to the ink column 5. When physical properties of the ink such as surface tension, viscosity, etc., nozzle hole diameter (or diameter of the ink column), ink feeding pressure to the nozzle 1 (or ink ejection speed), vibrating exciting frequency, vibration and exciting strength, etc, ar at predetermined values, minute displacement in the diametric direction can be formed by the vibration on the ink column 5. This minute deformation grows as it reaches to the tip part of the ink column 5, and the tip of the ink column becomes to be separated into each one of the large diameter ink droplets 14 and small diameter ink droplets 15 alternatively during one cycle period of excitation. The ink droplet speed becomes approximately the same as the ejection speed of the ink from the nozzle hole. A phenomenon generating alternately 2 kinds of ink droplets, large and small, is a non-linear phenomenon necessarily formed by the development of the deformation (constriction) in the diametric direction formed in the ink column 5, and is depicted as an enlargement in FIG. 3. That is, the surface shaped in the vicinity of the tip of the ink column 5 provides the shape as shown in FIG. 3, and separation occurs at the points $\alpha$ and $\beta$ to consequently make the A part become large diameter ink droplets 14, and the B part small diameter ink droplets 15. As to this non-linear phenomenon, the main cause can be considered to be tbe energy transformation of the fundamental waves generated in the ink column 5 from low harmonic to high harmonic, but a perfect theoretical analysis has not yet been made. However, the inventor has confirmed the stable and sure generation of such large and small diameter ink droplets. For example, by using ink with a surface tension of 56 dyne/cm, viscosity of 2 cp, and specific gravity of 1, and by using a nozzle 1 with hole diameter of 240 $\mu$m, large diameter ink droplets 14 with the diameter of 400 $\mu$m and small diameter ink droplets 15 with diameter of 130 $\mu$m could be alternately and surely generated, in the case when the vibration exciting frequency was made as 9 kHz (at 9 kHz, large and small diameter ink droplets are generated), at the vibration exciting voltage of 5 $V_{pp}$ 30 $V_{pp}$ for the ink feeding pressure of 0.7 kg/cm$^2$.

Next, explanation will be given as to the means of separating the flight paths of large diameter ink droplets 14 and small diameter ink particles 15. In FIG. 1, where a charged electrode at a constant potential is installed in the vicinity of the tip of the ink column 5, a charge can be statically induced at the tip part of the ink column 5. Therefore, the tip of the ink column 5 becomes separated as a droplet as it is holding an electrical charge. In this case, the amount of electric charge held by an particle is proportional to the diameter of the ink droplet, and when the diameter of the large diameter ink droplet 14 is 400 $\mu$m and the diameter of the small diameter ink droplet is 130 $\mu$m, then the ratio of the amount of electrical charge held by both of them becomes approximately 3 : 1. When such electrical charge holding droplets fly through a static electrical field formed between the deflecting electrodes 9*a* and 9*b*, static electrical deflection is formed. The deflection amount D in this case can be obtained from the various factors shown in FIG. 4 as follows:

$$D = \tfrac{1}{2}(E \cdot Q/M) \cdot (b/v)^2(1 + 2 \cdot L/b)$$

where,

E: Strength of the electrostatic field for deflection
*Q:* Charge amount in an ink droplet
*M:* Mass of an ink droplet
*v* Flying velocity of an ink droplet
*b:* Length of the deflecting elecric field
*L:* Flight distance from the end terminal of the deflecting electric field According to the afore-mentioned charging means, the interrelation between the charged amount Q of an ink droplet and the droplet diameter $\phi$ is $Q = \alpha \cdot \phi$, and the interrelation between the mass of an ink droplet and the droplet diameter is $M = \alpha \cdot \phi 3$, so that the deflection amount D of an ink droplet is inversely proportional to the square of the ink droplet diameter. For example, in the case where the diameter of the large diameter ink droplet 14 is 400 $\mu$m, and the diameter of the small diameter ink droplet is 130 $\mu$m, the ratio of the deflection amount of respective ink droplets in the same flight distance attains to the order of about 1 : 9. Therefore, the expected flight distance for the large diameter ink droplet 14 (400 $\mu$m) and the small diameter ink droplet (130 $\mu$m) corresponds each to the broken lines 24 and 25 in FIG. 4, and the flight paths of both ink droplets can be separated.

Next, explanation will be made as to a technique for changing the flight speed of the small diameter ink droplet 15 against the flight speed of the large diameter ink droplet 14 based on the electric signals for recording. Putting this in a conclusive manner, the flight speed of the small diameter ink droplet 15 changes relative to that of the large diameter ink droplet 14, when the strength of the vibration acting on the ink column 5 is changed by changing the magnitude of the vibration exciting voltage applied to the PZT electrostrictive vibrator 22. The interrelation of the flight velocity $v_s$ of the small diameter ink droplet 15 to the vibration exciting voltage V*e* is shown in FIG. 5*a*. The flight velocity $v_s$ in the case when the vibration exciting voltage V*e* is chosen as $Ve_1$ is equal to the flight velocity of the large diameter ink droplet 14, and when the vibration exciting voltage is larger than the value, the flight velocity of the small diameter ink droplet 15 becomes larger than that of the large diameter ink droplet 14, and when the vibration exciting voltage becomes small, the flight velocity becomes slow. For example, under the condition where the afore-mentioned large diameter ink droplet 14 with diameter of 400 $\mu$m and small diameter ink droplet 14 with diameter of 130 $\mu$m are generated at the frequency of 9 kHz, the flight velocity $v_s$ of the small diameter ink droplet 15 can be changed in the range of 10.7 m/sec to 12 m/sec by varying the vibration exciting voltage V*e* between 8 $V_{pp}$ to 26 $V_{pp}$. In this case, the flight velocity $v_p$ of the large diameter ink droplet 14 is 11 m/sec. Such speed change characteristics can be explained in relation to the separation characteristics shown in FIG. 3. That is, it relates to the time of separation of point $\alpha$ and point $\beta$. When the point $\beta$ separates after the point $\alpha$ separated, the small diameter ink droplet part B is attracted to the large diameter ink droplet part A by the surface tension and accelerated to become to obtain a faster flight speed than the flight speed of the large diameter ink droplet 14. On the contrary, when the point $\alpha$ separates after the point $\beta$ has seperated, the small diameter ink droplet part B is drawn back to the side of the ink column 5 and the flight speed thereof becomes slower than the flight speed of the large diameter ink droplet 14. As the difference of the time of separation of the both points becomes larger, the accelerating and retarding action forces become larger, and when the separation occurs at the same time, such actuating forces are not formed substantially and the both ink droplets acquire equal speed. In this case, 1 cycle of the ink droplet separation corresponds to one cycle of the vibration exciting cycles to the ink column 5, or to the vibration exciting voltage supplied to the electrostrictive vibration 22, and the flight speed of the small ink droplet 15 against that of the large diameter ink droplet 14 can be controlled by varying the vibration exciting strength. Therefore, in FIG. 1, by controlling every one cycle the magnitude of the vibration exciting signal voltage applied to the electromechanical oscillator 3 from the high frequency power source 2, speed control of the small diameter ink droplets 15 for forming recording dots can be effected surely for each one of droplets.

Next, explanation will be given as to the action principle for performing the recording by combining each of the above-described actions with the action of the catcher means 11 for the ink droplets unnecessary to recording.

When the flight speed of the small diameter ink droplet 15 is restricted, the flight state of the large diameter ink droplets 14 and the small diameter ink droplets 15 varies as shown by (1), (2), and (3) in FIG. 6. That is, when $v_s = v_p$ is the relation of the flight speed $v_s$ of the small diameter ink droplets 15 to the flight speed $v_p$ of the large diameter ink droplets 14, both ink droplets 14 and 15 do not unite but fly in line with each other as shown in (1). When $v_s > v_p$, the small diameter ink droplet 15 catches up with the large diameter ink droplet and is united thereto as shown in (2), and when $v_s < v_p$, the small diameter ink droplet 15 is overtaken by the large diameter ink droplet as shown in (3) and is united. The distance *d* from the tip of the ink column to the position where both ink droplets 14 and 15 unite is determined by the relative velocity of both ink droplets 14 and 15. Therefore, in the ink droplet forming device shown in FIG. 2, the distance *d* (or the flight time) required for both ink droplets until they become united can be changed by varying the vibration exciting voltage V*e*. For example, for the V*e* – $v_s$ characteristics shown in FIG.5*a*, the V*e* – *d* characteristics shown in FIG. 5*b* becomes to correspond thereto.

On the other hand, the flight path separation amount S of the large diameter ink droplet 14 to the small diameter ink droplet 15 becomes as depicted in FIG. 7*a* against the flight distance *l* of the ink particles. Now, let the respective diameter of each of the large diameter ink droplets 14 and the small diameter ink drop 15 be $\phi_p$ and $\phi_s$, and the flight distance required for the flight path separation amount S for both ink droplets to become $$(\phi_p+\phi_2/2)$$

be $l_1$, then, when both ink droplets are made to become united before reaching to this distance $l_1$, the small diameter ink droplet 15 does not trace an independent flight path 25 but is united with the large diameter ink droplet 14 and flies along the flight path 24. Therefore, when an ink droplet catcher means 11 is established in such a way as to interrupt the flight path of the ink droplets formed by the unification of large and small diameter droplets and the large diameter ink droplets, the small diameter ink droplts 15 unnecessary for recording can be cought or trapped.

However, in the case where the relative flight speed is such that both ink droplets 14 and 15 become united at a flight position after $l_1$, the small ink droplets 15 become deflected to a large extent so that they can not be united to the large diameter ink droplets 14, and become to fly along an independent flight path 25 as shown in FIG. 8*b*, and form recording dots by reaching to a surface 12 of a matter to be recorded.

Such control for the distance necessary for the large diameter ink droplets 14 and the small size ink droplets 15 until they become united can be effected in dependence on the control characteristics shown in FIG. 7*b*. As relationships of the large and small diameter ink droplets unification distance *d* to the vibration exciting voltage V*e*, there are characteristics A for $v_s > v_p$ and characteristic B for $v_s < v_p$. When the flight speed $v_s$ is controlled in dependence to the characteristic A, the vibration exciting voltage V*e* is made as $Ve_2$, so that the small diameter ink droplets 15 are united to the large diameter ink droplets 14 and are caught by the catcher means 11 an do not reach the surface 12 of the matter to be recorded. When selection is made as $Ve = Ve_3$, the small diameter droplets 15 fly independently and reach the surface 12 of the matter to be recorded to be enabled to form recording dots. In FIG. 9, (1) is the figure of the recording dot prescribed positions shown by separating in the scanning direction, and the recording dots are formed at the hatched positions. (2) shows the electric signal for recording use, and (3) the vibration exciting voltage V*e* in dependence to the characteristic A of FIG. 7. The vibration exciting voltage V*e* is modulated in tbe modulating device 16 by the electric signals for recording use to become $Ve_1$ and $Ve_3$. In the case where the flight velocity is controlled and recorded in dependence to the characteristic B, V*e* should be modulated into $Ve_4$ and $Ve_5$.

Then, the vibration exciting voltage V*e* containing the recording information as shown in FIG. 9(3) and (4) can be obtained by multiplying the pulse signal from the recording signal generator 8 having width of 1 cycle of vibration excitation corresponding to one small diameter ink droplet with the sine wave signal from the high frequency power source 2 by the modulating device 16.

For example, under the afore-mentioned ink droplet forming conditions, 9,000 droplets per second of large diameter ink droplets 14 with diameter of 400 $\beta$m and small diameter ink droplets 15 with diameter 13062 m were formed as charged ink droplets by applying D.C. charge voltage of approximately 500 V to the charging electrodes 7 having a gap of 3.5 mm, and these ink droplets were made fly in a electrostatic field formed by applying D.C. voltage of 3.9 kV to the parallel deflecting electrodes 9a and 9b, 15 mm long and having a gap of 7 mm. Then, by controlling the droplets in dependence to the characteristic A of FIG. 8b, and at $Ve_2 = 25$ V and $Ve_3 = 20$ V, the dot formation by the small diameter ink droplets 15 could be controlled.

Explanation will be given on a facsimile device, which is actualized on the basis of the above-described controlling principle by referring to FIG. 10.

In the recording electric signal generating device 8, numeral 26 is a rotary drum for transmitting signals, and an original picture 27 is wound around the rotating drum 26 which is rotated to the arrow M direction. Numeral 28 denotes an optical system, in which the light coming out of a light source 29 is collected by a condenser lens 30 to illuminate the original picture 27. A reflected light is received by the objective lens 31, and subsequently led to the photo-electric detective element 33 via the slit 32 to be transformed into an electric signal. As the photoelectric detective element 33, a photomultiplier tube, a phototransistor, etc. are used. This optical system 28 is driven in the axial direction (in the arrow I direction) accompanying to the rotation of the rotary drum 26, and the original picture 27 is successively scanned from its one end (from left to right, in FIG. 10). The electric signals thus obtained are passing through an amplifier 50 and a waveform shaping circuit 34 such as a Schmitt trigger circuit, etc., and are converted to binary signals with a predetermined level representing black and white. This binary signals i.e. image signal are given to the D-terminal of the D-type flip-flop 35. On the other hand, the output signal of the high frequency power source 2 is converted to a clock pulse via a waveform shaping circuit 36 such as a Schmitt trigger circuit, or the like, and the clock pulse is fed to the T-terminal of the above-described D-type flip-flop 35. By use of the both signals, the D-type flip-flop 35 is controlled. If the flip-flop 35 is provided so as to be triggered by the rise slope of the clock pulse, then a recording electric signal synchronized to the high frequency power source 2 can be obtained at the output terminal $\overline{Q}$ by making the pulse signal with the width of 1 cycle period of excitation corresponding to the small diameter ink droplet 15. However, in a case where the generation of the small diameter ink droplets 15 is too many for the recording of the image, or where some of the small diameter ink droplets 15 should be thinned in order to prevent recording distortion due to mutual interference, it's better to obtain the recording signal after frequency dividing via the AND gate 38, a frequency divider 37, and the NAND gate 39. The electric signals made in such a manner is derived by the change-over switch 40 in a cycle period suitable for the object as recording electric signals.

The recording electric signals obtained in such a manner are led to the vibration exciting electric signal modulating device 16, and are multiplied by a multiplier 43 with the sine wave signal obtained from the high frequency power source 2. In order to make the phases of the recording electric signal and the sine wave signal coincide, the sine wave signal of the high frequency power source 2 is input to the multiplier 43 via a phase adjusting circuit 41. Then, the recording electric signal is set to a predetermined value by the potentiometer for adjusting the modulation level and input into the multiplier 43. The multiplication output obtained from the multiplier 43 is amplified by the amplifier 17 to become the signal voltage for vibration excitation use as shown as (3) in FIG. 9.

Numeral 44 denotes a recording device, in which an ink droplet control mechanism 45 is provided so as to receive the signal voltage for vibration excitation use, and, in the same way as afore-mentioned, recording dots by the small diameter ink droplets 15 on the surface of the matter to be recorded 12 (i.e. a recording paper). The recording paper 12 is wound up by the receiving rotary drum 46, which is rotated in the direction M in synchronization with the transmission rotary drum 26. The ink droplet control device 44 displaces to the arrow I direction in the same way as the optical system 28 to scan the surface of the recording paper 12. Therefore, the external diameters of the transmission rotary drum 26 and the receiving rotary drum 46 are made equal in size, and both drums are rotated synchronously to make a copy picture on the drum 46 and recording paper 12 wound around thereon be in the same phase, which will make the recording of the picture image of the original picture 27 on the recording paper surface by the assembly of a number of dots.

Although, in the above-described embodiment, the charging electrode 7 and the deflecting electrodes 9a and 9b, which are used to make difference in the flight path of each ink droplet, were installed independently, these electrodes can be combinedly used. An example of such combined electrode type recording device is shown in FIG. 11. That is, by making the electrostatic field formed by the electrodes 9a and 9b approach the position where it is able to act on the ink column 5, the charging electrode 7 can be omitted. In this case, the ink column 5 forms electrostatic capacity with the deflecting electrode 9b therebetween, and the ink column 5 is charged by the D.C. high voltage power source 10 to give charge to ink droplets. According to this example, the electrode structure intervened between the nozzle 1 and the catcher means 11 is simplified, so that the flight distance of ink droplets is reduced to enable more faithful recording. Moreover, fine and delicate adjustments in a small charging electrode for dispersing the ink column 5 into ink droplets 14 and 15 becomes unnecessary.

FIG. 12 shows an example in which the deflection of the ink droplets is effected by a laminar flow 47 of the gas. In this case, the laminar flow 47 of the gas, which is formed by a blower (not shown), or the like, is fed approximately in a perpendicular direction to the flight direction of ink droplets 14 and 15. In this instant, the inertia of the ink droplets is proportional to the third power of the diameter, while the deflecting force due to the laminar flow 47 is proportional to the diameter, so that the small diameter ink droplets 15 are deflected to a greater extent than the large diameter ink droplets 14 to ultimately enable the flight path be separated. Such deflection due to the gas laminar flow does not form discharge or the like from the electrode, so that there is the advantage of making the use of inflammable ink easy.

According to each embodiment described above, the need for generating the charging signal pulse voltage with the phase synchronized to the generation of ink droplets is absent, so that an automatic phase adjustment circuit and a high output amplifier with high response become unnecessary. Furthermore, it's capable of easily controlling the deflection of ink droplets even in the case where relatively low conductive ink is used, and as the ink droplets used in recording are small diameter ink droplets, and the formation of dots in case of using a nozzle with the small hole diameter as that of the conventional nozzle, results in obtaining dots with $\frac{1}{3}$ to $\frac{1}{4}$ diameter size, a recording image with high resolution can be obtained even by use of a large diameter nozzle.

What is claimed is:

1. An ink jet recording device characterized in that it comprises;

a nozzle ejecting pressurized ink toward a surface to be recorded, vibration exciting means for giving to said ink mechanical vibration with such magnitude as to make an ink column ejected from said nozzle to be separated alternately into large and small ink droplets at a tip part thereof, means for generating recording electric signals, controlling means for uniting, during flight, said small diameter ink droplets unnecessary to recording with said large diameter ink droplets by controlling the relative flight velocity between said large diameter ink droplets and said small diameter ink droplet by varying vibration exciting strength of said vibration exciting means in accordance with said recording electric signals, deflecting means for acting on the ink droplet flight path to make the deflection amounts of said large diameter ink droplets and small diameter ink droplets become different, and catcher means for intercepting the flight path of said large diameter ink droplets and the ink droplets formed by the unification of the large and small droplets.

2. An ink jet recording device according to claim 1, characterized in that said deflecting means is a laminar flow of a gas acting in a perpendicular direction to the ink droplet flight path.

3. An ink jet recording device according to claim 1, characterized in that said deflecting means thereof comprizes a charging electrode forming static capacity with said ink column therebetween, a charging D.C. power source for supplying a constant voltage between the ink and said charging electrode, and deflecting electrodes for actuating a definite electrostatic field to the ink droplet flight path.

4. An ink jet recording device characterized in that it comprises;

a nozzle for ejecting a pressurized ink toward a surface to be recorded, vibration exciting means for providing mechanical vibration to said ink in such magnitude as to separate said ink column ejected from said nozzle at said tip part thereof alternately into large diameter ink droplets and small diameter ink droplets, means for generating recording electric signals, controlling means for uniting, during flight, said small diameter ink droplets unnecessary to recording with said large diameter by droplets controlling a relative flight speed of said large diameter ink droplets and said small diameter ink droplets by varying the vibration exciting strength of said vibration exciting means on the basis of said recording electric signals, deflecting means for giving such a deflecting force to the ink droplets as to act on said ink droplet flight path to deflect said small diameter ink droplets for a predetermined amount, and catcher means for intercepting the flight path of said large diameter ink droplets and said ink droplets formed by a unification of the large and small size ink droplets.

5. An ink jet recording device characterized in that it comprises:

a nozzle for ejecting a pressurized ink toward a surface to be recorded, an electrostrictive vibration element attached to said nozzle, a high frequency power source for making a tip of an ink column ejecting from said nozzle to be alternately separated into large diameter ink droplets and small diameter ink droplets by giving a vibration exciting voltage to said electromechanical transducer element, a charging electrode established to form static capacity with said ink column, a charging D.C. power source for giving a constant D.C. voltage to said charging electrode, deflecting electrodes for making a static electric field effect an ink droplet flight path to form deflected flight paths of said smaller diameter ink droplets and of said large diameter ink droplets, means for generating recording electric signals, modulating means for varying a magnitude of said vibration exciting voltage in accordance with said recording electric signals, and thereby making small diameter ink droplets unnecessary for recording unite during flight with said large diameter ink droplets, and catcher means for intercepting said large diameter ink droplets and small diameter ink droplets united with said large diameter ink droplets.

6. An ink jet recording device characterized in that it comprises:

a nozzle for ejecting pressurized ink toward a surface to be recorded, vibration exciting means for giving mechanical vibration to an ink column ejected from said nozzle at a tip part thereof in such a magnitude as to make it separate alternately into large diameter ink droplets and small diameter ink droplets, an electrode for making a constant elctrostatic field act on said ink column and an ink droplet flight path, means for generating recording electric signals, a controlling device for varying vibration exciting strength of said vibration exciting means in accordance with said recording electric signals and thereby making a flight speed of said small diameter ink droplets relative to said large diameter ink droplets vary to make said small diameter ink droplets unnecessary for recording be united during flight with said large diameter ink droplets, and catcher means for intercepting the flight path of said large diameter ink droplets and the ink droplets formed by the unification of said large and small ink droplets.

7. An ink jet recording device characterized in that it comprises:

a nozzle for ejecting pressurized ink toward a surface to be recorded, an electromechanical transducer element attached to said nozzle, a high frequency power source providing output signals, an electric circuit for supplying vibration exciting voltage to said electromechanical transducer element in accordance with the output signal of said high frequency power source, such that said pressurized ink ejected from said nozzle is formed alternately into large diameter ink droplets and small diameter ink droplets, deflecting means for acting on the ink droplets flight paths to deflect said small diameter ink droplets and said large diameter ink droplets by different amounts, wherein said small diameter ink droplets unnecessary for recording are united with said large diameter ink droplets during flight with said large diameter ink droplets, catcher means for intercepting the flight path of said large ink droplets and united droplets of said large and small droplets, and recording electric signal generating means for generating recording electric signals in synchronization with the output signals of said high frequency power source, said electric circuit including a modulation circuit for forming the vibration voltage signal by controlling the magnitude of said output signals from said high frequency power source in accordance with said recording signals.

8. An ink jet recording device according to claim 7, wherein said recording electric signal generating means includes a logic circuit having flip-flop means for synchronizing said recording generating signals with said high frequency power source output signals in accordance with formation of said small diameter ink droplets, and frequency dividing means for compensating the formation of excess small diameter ink droplets.

* * * * *